Nov. 23, 1943.  A. E. HOLLENBECK  2,334,928
SHANK FOR INSERTABLE SAW TEETH
Filed Nov. 10, 1941    2 Sheets-Sheet 1
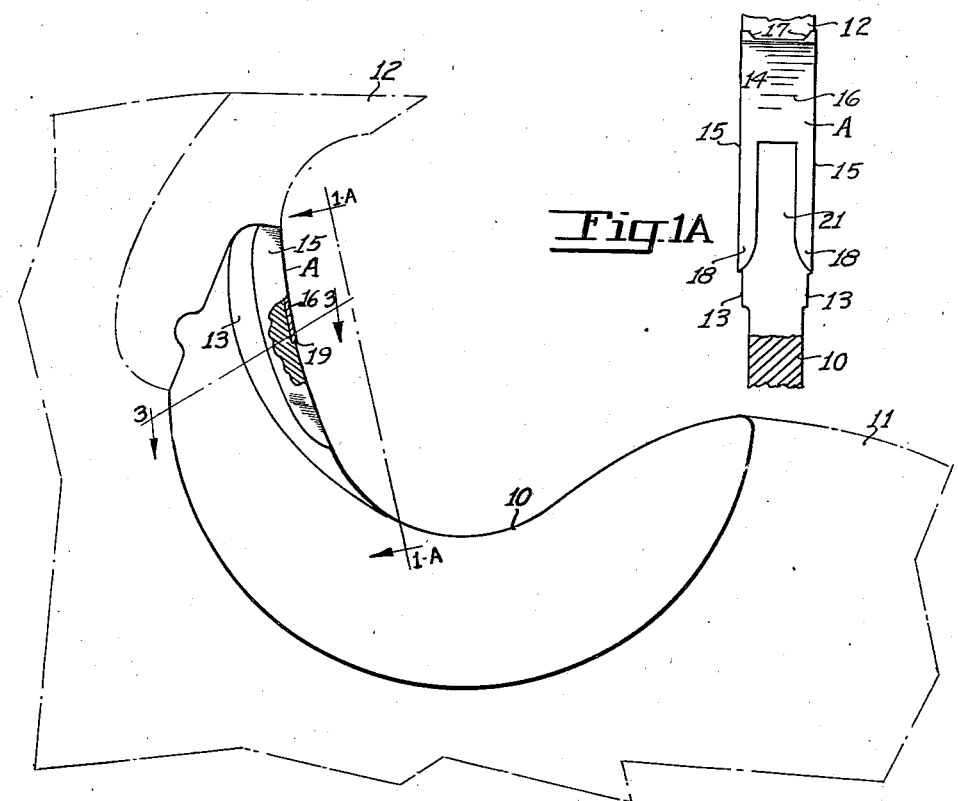
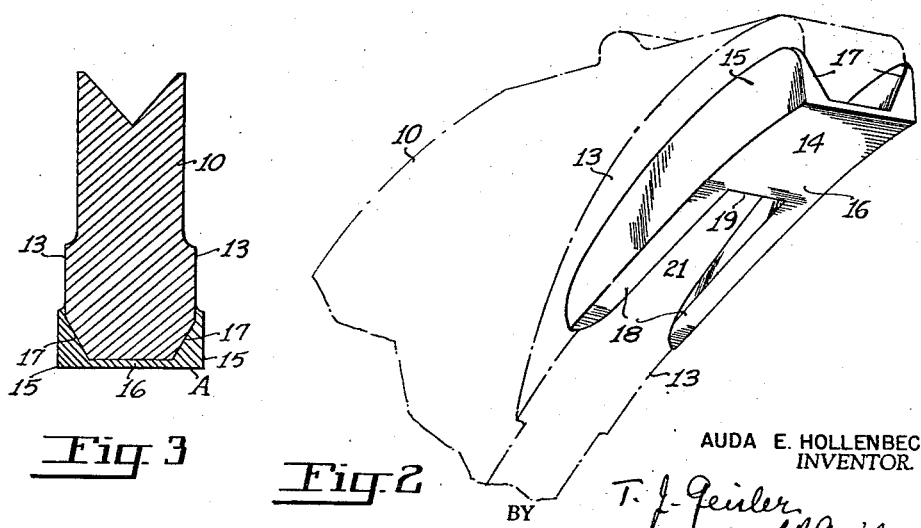
AUDA E. HOLLENBECK
INVENTOR.
BY
ATTORNEYS Nov. 23, 1943.    A. E. HOLLENBECK    2,334,928
SHANK FOR INSERTABLE SAW TEETH
Filed Nov. 10, 1941    2 Sheets-Sheet 2

AUDA E. HOLLENBECK
INVENTOR.

BY *T. J. Geisler and*
*F. R. Geisler.*
ATTORNEYS

Patented Nov. 23, 1943

2,334,928

UNITED STATES PATENT OFFICE 2,334,928

SHANK FOR INSERTABLE SAW TEETH

Auda E. Hollenbeck, Portland, Oreg.

Application November 10, 1941, Serial No. 418,457

5 Claims. (Cl. 143—151)

This invention relates to saws, and, in particular, to circular saws having removable or insertable teeth. More specifically, this invention relates to the holders or shanks by means of which the removable saw teeth are held in place on the saw body or blade.

As is well known, in saws of this type, wear occurs not only on the tooth itself but also on the shank adjacent the tooth. This wear on the shank is caused by the passage of sawdust and slivers between the saw and the timber walls of the kerf in the wood made by the saw; and the more the shank becomes worn in this manner the greater is the proportion of sawdust and slivers which force their way between the saw and the walls of the kerf instead of being carried by the saw temporarily until the saw clears itself upon leaving the kerf. This passage of the sawdust and slivers between the sides of the shank and saw blade and the walls of the kerf has other disadvantages besides the wearing away of the shank, because this tends to interfere with the action of the saw by reducing its peripheral speed, and, since the sawdust and slivers are wedged and assert a binding action against the saw, they produce wear on the sides of the blade or body of the saw and increase considerably the frictional head developed. Such a condition may also produce an irregular cut when large chips are forced past the side of the saw and there is also scoring of the sides of the kerf in the wood as well as other damage to the saw blade.

To overcome these difficulties and to prevent or retard the wearing away or rounding of the top surface of the shank, adjacent the tooth, and thus decrease the tendency for the sawdust and slivers to pass over the sides of the shank, various improvements have been invented in the nature of protective guards and welded inlays, for covering these portions of the shank surface. While some of these devices which are less impractical than others and are not too expensive, when made of the proper metal, do serve to retard the wear of the shank, these have not been successful in entirely eliminating the difficulty. Even when these parts are protected by a separate cap of harder metal, the difficulty has not been remedied entirely satisfactorily because the cap must nevertheless wear to some extent and, as it wears, the tendency for the sawdust and slivers to force their way over the sides of the cap and shank increases, and this in return increases the rate at which the wear proceeds. This will be understood more clearly from an explanation later of the manner in which the wear takes place and its effects. Also the wearing of the shank at the end adjacent the tooth makes this end, which holds the tooth, weaker and thinner and further develops a tendency for this holding end to become rounded, with the result that the tooth is held more or less loosely in the saw with danger of the tooth being pushed sideways.

The object of this invention is to provide means for preventing this undesirable wearing of the tooth shank or holder and to provide a means which will be practical, simple and comparatively inexpensive, and at the same time more efficient than the means previously attempted or suggested, as above indicated.

A further object of this invention is to provide a means for preventing, to a considerable extent, the passage of the sawdust and slivers over the sides of the saw tooth holder or shank, and for causing such sawdust and slivers, instead, to be carried through the kerf by the shank until these are discharged when the saw clears itself upon leaving the cut or kerf of the wood.

These objects I accomplish by applying a special welded inlay of hardened metal to the shank in the manner hereinafter briefly explained, and by providing for a sawdust-carrying pocket on the top surface of the shank as hereinafter described.

In the following description, reference is made to the accompanying drawings in which:

Figure 1 is a side elevation of my saw tooth holder or shank, the shank being shown in position in the blade of the saw and the saw and saw tooth being indicated in broken line;

Figure 1A is a fragmentary top view of the shank of Figure 1;

Figure 2 is a view in perspective of the hard metal inlay or cap of the shank, shown in inverted position for the sake of clarity, and the adjacent portion of the shank being shown in broken line;

Figure 3 is a transverse section through the shank taken on the line 3—3 of Figure 1;

Referring first to Figure 1, 10 indicates the tooth holder or shank set in position in the body or blade 11 of the saw and holding the removable tooth 12 in place. The shank and removable tooth are of the general form and shape which are well known in saws of this type. It is also customary with insertable saw teeth and shanks of the form indicated, to broaden the top surface of the shank adjacent the tooth by building out the sides of the shank as shown at 13 in Figures 1, 2 and 3. In this way the top surface of the shank adjacent the tooth is made wider, or thicker through, than the remaining body of the shank, its width being made to conform more nearly to the width of the adjacent portion of the tooth. The purpose of this widening of the top surface of the shank is three-fold; first, it provides a broader surface on the shank for receiving the sawdust and slivers produced by the tooth in the cutting of the wood; second, the broadening of the shank at this portion leaves a smaller space between the sides of the shank and the walls of the kerf and consequently less space for sawdust and slivers to pass down between the saw and the walls of the kerf; and third, a thicker wearing surface is provided for the sides of the shank and along the top-edges where the greatest wear occurs.

Figure 7:
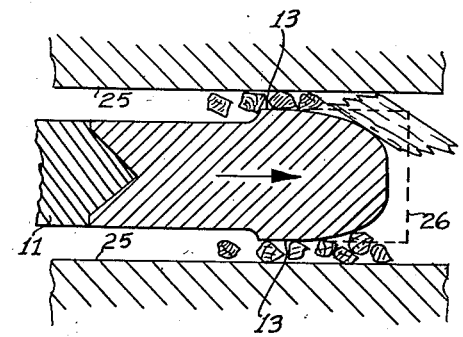
Figure 7 is a transverse section taken on the line 7—7 of Figure 6, showing also the adjacent kerf walls as in Figure 5, and illustrating the effect of wear on a conventional shank, and the resulting paths taken by the sawdust and slivers.

As previously indicated, there is always more or less tendency for the sawdust and slivers to pass between the saw and the kerf walls in a direction opposite to that being described by the saw. As long as a broad flat top surface is maintained on the shank adjacent the tooth this tendency is minimized and the greater portion of the sawdust and slivers will be held on this top shank surface until the saw passes out of the kerf, whereupon the sawdust and slivers carried on the shank will be thrown off and the saw caused to clear itself. However, even under the best of conditions, some wear occurs on this part of the shank with the passage of the sawdust and slivers over it, and gradually the sides wear down and the top surface becomes rounded. Figure 7 shows a tooth shank which was originally made with such a broadened top surface but which has begun to wear away, the original surface being indicated by the broken line 26. It will be apparent that as the wearing increases, the proportionate amount of sawdust and slivers which will force their way down between the sides of the shank 10 and the walls 25 of the kerf also increases, and the greater the amount of sawdust and slivers passing over these edges and side surfaces becomes, the faster will be the consequent wearing away of such surfaces. As a result, it has been found that tooth shanks require frequent replacing and that if they are allowed to run too long they wear away with increased rapidity, impairing the work of the saw and eventually causing damage to the saw.

Attempts have been made to surface this portion of the top and sides of the shank with harder metal, and for this purpose caps have been made of harder metal than it would be practical to use for the main body of the shank. While the rate of wear is naturally slower with harder metal than with the ordinary metal from which the body of the shank is made, nevertheless some wear must take place, and the only advantage achieved is the fact that this undesirable wear and resulting disadvantages are spread over a longer period of time.

In my efforts to find a remedy for these difficulties I have discovered that quite remarkable results are obtained by applying an inlay of hardened metal on the outer part of the forward face of the shank and arranging this in special U-shaped form. The shape of this inlay A can be seen in Figures 1A and 2, and its structural form is also indicated in Figures 1 and 3.

The outer portion 14 of the inlay A comprises a flat forward surface 16 and side walls 15. Preferably I taper the inner surfaces 17 of the sides 15 (see Figures 2 and 3) inwardly and towards their juncture with the surface 16, while the exterior surfaces of the side walls are kept perpendicular to the forward surface 16. The side walls of the shank must of course be ground away correspondingly before the inlay is applied.

The forward surface 16 of the inlay or cap however, does not extend the full length of the inlay but is cut away for a substantial distance, preferably for one-half or more of the length of the inlay so as to form a U-shaped inlay with an opening 21 between the extended sections 18. These extended sections 18 continue to the end of the inlay as shown in Figures 1, 1A and 2. Thus beyond the terminal end 19 of the forward surface 16 of the forward portion 14, the portions 18 and the side walls continue and form corners of hard metal for a substantial distance along the shank (see Figures 2 and 5).

The inlay A is made of harder metal than the rest of the shank. For example, if the shank is made of metal of a hardness corresponding to 42 Rockwell C test, I have found it desirable to have the inlay of metal having a hardness corresponding to 48 Rockwell C test. The inlay may be made from non-ferrous alloy of tungsten, chromium, and cobalt, such as that known as "Stellite," and other hard metal alloy may also be used. Such alloyed metal is applied to the surfaces of the shank, at the places to be covered, by a "welding" operation, that is to say, the alloy is melted and caused to adhere to the shank surfaces simultaneously with the heating of the shank by an oxyacetylene flame or other suitable means. Other means of producing and attaching the inlay or cap may of course be used, and the composition of the inlay may also be varied. The alloy mentioned is suggested merely by way of illustration. It is however, essential in my invention, that the inlay or cap be of harder metal than the rest of the shank, and the reason for this will appear presently.

Figure 4:
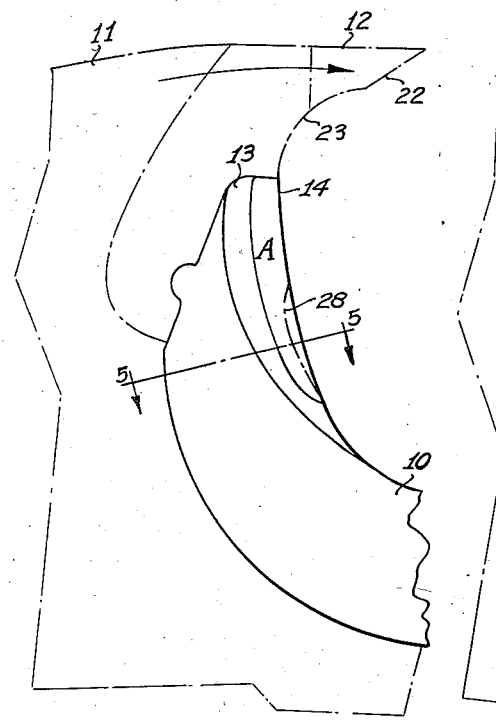
Figure 4 is a partial side elevation of the shank, similar to Figure 1, the shank having my improved inlay or cap, and this figure indicating, by a broken line, the effect of wear on the top surface of the shank.
Figure 6:
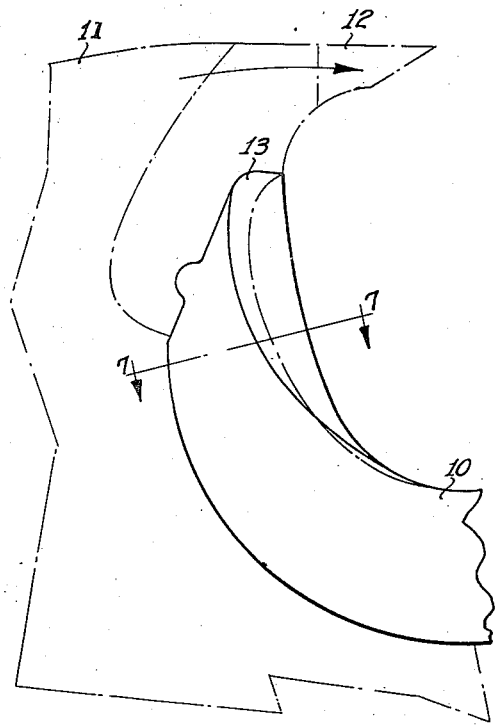
Figure 6 is a side elevation of a conventional tooth shank without my improved inlay or cap.
Figure 5:
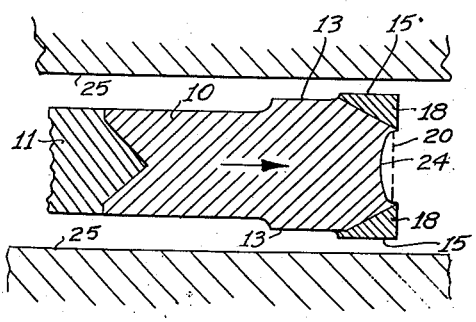
Figure 5 is a transverse section taken on the line 5—5 of Figure 4 but including partial section through the adjacent walls of the kerf made by the saw in the wood.

I have already explained, with reference to Figure 7, the manner in which an ordinary shank wears under the abrading action of the sawdust and slivers. However, when the shank is provided with my inlay, the wear takes place in quite a different manner and produces a different result. As the saw tooth cuts through the wood, the sawdust and slivers pass from the tip 22 (Figure 4) of the saw along the surface 23 to the shank. Upon reaching the shank the sawdust and slivers encounter the hardened surface of the outer portion 14 of the shank and finally reach the cut-out portion 21 of the inlay. While some of the sawdust and slivers will of course find their way over the sides of the inlay and pass over the sides of the shank, the greater portion will move a slight distance along the surface 16 first. In so doing, they reach the beginning of the cut-out portion 21. The cut-out portion 21 of the inlay with the extended portions 18 of the hard metal at the sides forms a slight pocket with the softer metal of the shank body for the bottom of the pocket. There is a tendency for the sawdust and slivers to be drawn into this portion or pocket on the forward face of the shank. Then, as the inlay wears, it will be found that the softer metal within this pocket or cutout portion will wear slightly deeper, and since the bottom is formed of softer metal, this wear will take place comparatively quickly until a pocket is formed of substantially the depth shown at 24 in Figure 5 and as indicated by the broken line 23 in Figure 4. In Figure 5 the broken line 20 indicates the original surface of this pocket section. This pocket will however not increase in depth indefinitely, but, after wearing to a certain depth, such as that indicated in Figure 5, the comparative difference in level between the surface at the bottom of the pocket and the surface at the extended portions 18 of the harder capping metal will be maintained, and from then on the bottom of the pocket will be worn deeper only at the same rate the surface of the inlay is worn down. The fact that the sawdust and slivers tend to remain in this pocket instead of passing through it or over the sides of inlay will explain why the pocket does not continue to wear down rapidly indefinitely. Also the fact that the sawdust and slivers tend to pass into this pocket and to remain there temporarily results in less wear on the outside edges and sides of the inlay with the result that the outside edges of the inlay have less tendency to become rounded, and thus less tendency for any appreciable increase in the amount of sawdust and slivers passing over the sides of the inlay and shank into the kerf. As a result of these effects produced, I have found that an inlay or cap formed in the shape of the inlay A, with the cut-out portion or pocket-forming section extending substantially as shown, will wear very much longer than a cap of the same metal formed to cover the entire forward face of the shank, and without any provision for the making of a pocket in this forward face. In other words, by providing a suitable pocket in the forward face of the shank, sufficiently close to the tooth surface, a substantial portion of the sawdust and slivers will collect in the pocket and remain there, instead of being forced over the sides of the shank, until the saw passes out of the kerf.

However I have also found that if this pocket is permitted to be formed immediately adjacent the tooth itself, that is to say, if the central uncovered portion 21 were continued to the end of the shank adjacent the tooth 12 without having any intervening surface 16 between the top edges of the inlay or cap, the pocket would then wear more rapidly and more deeply with the result that the portion of the shank adjacent the tooth would become too weak to hold the tooth properly while the pocket would be worn so deep that it would not properly clear itself when the shank left the saw kerf. Thus it is necessary that the forward portion 14 of the inlay or cap have a flat top surface 16, extending entirely over that portion of the top surface of the shank between the tooth and the portion 21 where the pocket is to be formed. The sawdust and slivers strike against this flat top surface first and then pass along to the cutout portion 21. The distance which this flat top surface 16 extends along the shank depends of course upon the size of the tooth and shank. In ordinary sizes of shanks and saw teeth of the type illustrated I have found that this top surface should extend for a minimum distance of about one-fourth of an inch from the end of the shank adjacent the tooth. To make this surface too long would cause the slivers and sawdust to be forced over the sides of the shank instead of into the cutout portion, while, on the other hand, to make this surface too short, or to eliminate it altogether, would cause too deep a pocket to be formed between the top edges of the inlay or cap and would soon result in fracture of the shank.

It would be possible to make variations in the improved inlay or cap which I have shown, and to make minor changes in its structure without departing from the principle of my invention. It is only necessary that the inlay or cap be formed of suitable hard metal, and that provision be made for the proper sawdust-and-sliver-retaining pocket in the top surface for the reasons explained. I believe the sample form in which I have shown the inlay in the accompanying drawings will however be found most practical for all general conditions.

I claim:

1. In a shank of the character described for holding an insertable tooth in a saw, an inlay of harder metal than the body of said shank, said inlay located on and secured to the forward face of said shank, said inlay so arranged as to cover entirely the outer part of the forward face of the shank adjacent the tooth but having an open portion on said face beginning a short distance from the outer end of said face, said inlay extending thence along said face on each side of said open portion, whereby the unprotected softer metal of said face at said open portion of said inlay will wear away sufficiently when the shank is used to form a shallow pocket for the collection of sawdust and slivers during the sawing operation.

2. In a shank of the character described for holding an insertable tooth in a saw, a shield of hardened metal, said shield located on the forward face of said shank, said shield so arranged as to cover entirely the outer part of the forward face of the shank adjacent the tooth but having an open portion on said face beginning a short distance from the outer end of said face, said shield extending thence along said face on each side of said open portion, whereby the unprotected metal of said face at said open portion of said shield will wear away sufficiently when the shank is used to form a shallow pocket for the collection of sawdust and slivers during the sawing operation, said shield having side walls extending over a portion of the sides of the shank for the entire length of said shield.

3. In a shank of the character described for holding an insertable tooth in a saw, a channel-shaped cap of harder metal than the body of said shank, said cap secured to the forward face of said shank, said cap so arranged as to cover entirely the outer part of the forward face of the shank adjacent the tooth but having an open portion on said face beginning not less than ¼ inch from the outer end of said face, said cap extending thence along said face on each side of said open portion, whereby the unprotected softer metal of said face at said open portion of said cap will wear away sufficiently when the shank is used to form a shallow pocket for the collection of sawdust and slivers during the sawing operation, said cap having side walls extending over a portion of the sides of the shank.

4. In a shank of the character described for holding an insertable tooth in a saw, an inlay of harder metal than the body of said shank, said inlay located on the forward face of said shank, said inlay so arranged as to cover entirely the outer part of the forward face of the shank adjacent the tooth but having an open portion on said face beginning approximately ¼ inch from the outer end of said face said inlay extending thence along said face on each side of said open portion, whereby the unprotected softer metal of said face at said open portion of said inlay will wear away sufficiently when the shank is used to form a shallow pocket for the collection of sawdust and slivers during the sawing operation, said inlay having side walls extending over a portion of the sides of the shank for the entire length of said inlay.

5. In a shank of the character described for holding an insertable tooth in a saw, an inlay of harder metal than the body of said shank, said inlay secured to the forward face of said shank, said inlay so arranged as to cover entirely the outer part of the forward face of the shank adjacent the tooth but having an open portion on said face beginning a short distance from the outer end of said face said inlay extending thence along said face on each side of said open portion, whereby the unprotected softer metal of said face at said open portion of said inlay will wear away sufficiently when the shank is used to form a shallow pocket for the collection of sawdust and slivers during the sawing operation, said inlay having said walls extending over a portion of the sides of the shank, the outer surfaces of said side walls being substantially perpendicular to said forward face and the inner surfaces of said side walls sloped inwardly towards their juncture with said face.

AUDA E. HOLLENBECK.